United States Patent [19]

Budzich

[11] Patent Number: 4,591,433

[45] Date of Patent: May 27, 1986

[54] AUTOMATIC CONTROLS OF WATER-OIL SEPARATING SYSTEM FOR USE WITH CENTRIFUGAL TYPE SEPARATOR

[75] Inventor: Tadeusz Budzich, Moreland Hills, Ohio

[73] Assignee: Fluid Power Components, Inc., Cleveland, Ohio

[21] Appl. No.: 746,132

[22] Filed: Jun. 18, 1985

Related U.S. Application Data

[63] Continuation-in-part of Ser. No. 629,907, Jul. 11, 1984, Pat. No. 4,534,860.

[51] Int. Cl.[4] .......................... B01D 33/04; B04B 9/06

[52] U.S. Cl. .................................... 210/114; 210/123; 210/137; 210/143; 210/167; 210/354; 210/377; 494/36; 494/49; 494/901

[58] Field of Search ............... 210/104, 114, 116, 121, 210/123, 126, 128, 137, 143, 167, 182, 187, 259, 354, 360.1, 377, 787; 494/35, 36, 49, 901

[56] References Cited

U.S. PATENT DOCUMENTS

| | | | |
|---|---|---|---|
| 2,723,079 | 11/1955 | Fulton et al. | 494/49 X |
| 2,755,992 | 7/1956 | Tait et al. | 494/49 |
| 2,792,172 | 5/1957 | Tait | 210/167 X |
| 3,140,257 | 7/1964 | Wilder, Jr. et al. | 210/114 X |
| 3,189,180 | 6/1965 | Scott et al. | 210/259 X |
| 3,269,155 | 8/1966 | Shaw | 210/121 X |
| 3,368,681 | 2/1968 | Kasten | 210/114 |
| 3,623,657 | 11/1971 | Trump | 210/104 X |
| 3,784,092 | 1/1974 | Gibson | 494/49 X |
| 4,046,315 | 9/1977 | Klingenberg et al. | 494/36 X |
| 4,054,519 | 10/1977 | Tufts | 210/104 |
| 4,081,373 | 3/1978 | Rozniecki | 210/114 |
| 4,165,032 | 8/1979 | Klingenberg | 494/49 |
| 4,221,323 | 9/1980 | Courtot | 494/49 X |
| 4,230,581 | 10/1980 | Beazley | 494/49 X |
| 4,264,442 | 4/1981 | Jackson | 210/114 X |
| 4,406,651 | 9/1983 | Dudrey et al. | 210/377 X |
| 4,492,631 | 1/1985 | Martin | 210/354 X |

*Primary Examiner*—Robert Spitzer
*Attorney, Agent, or Firm*—Baldwin, Egan & Fetzer

[57] ABSTRACT

A centrifugal filter separator system operable to separate from oil under pressure solid contaminants, by depositing them on the internal wall of a rotating drum, powered by reaction jet nozzles, while also separating water from oil and extracting it from the rotating drum through a water extraction circuit. A water-oil mixture from the water extraction circuit is passed through a pressurized gravity type separator, from which the separated oil is returned, on a continuous basis, back to the centrifugal filter separator system, while the quantity of the water retained in the gravity type separator is controlled by a water ejecting automatic control, responsive to the position of the water-oil miniscus, or to the position of the layer of water-oil emulsion separating water and oil within the separator.

11 Claims, 4 Drawing Figures

AUTOMATIC CONTROLS OF WATER-OIL SEPARATING SYSTEM FOR USE WITH CENTRIFUGAL TYPE SEPARATOR

This is a continuation in part of application Ser. No. 629,907, filed July 11, 1984, for "Water-Oil Separating System For Use With Centrifugal Type Separator", now U.S. Pat. No. 4,534,860.

BACKGROUND OF THE INVENTION

This invention relates generally to improvements in centrifuges for cleaning liquids.

In more particular aspects this invention relates to oil cleaners of centrifuge type, in which a drum, into which oil under pressure is fed, is mounted in bearings for rotation within a housing and rotated about a vertical axis by the reaction of oil jets from nozzles rotating with the drum.

In still more particular aspects this invention relates to centrifugal filter separators, based on the principle of Hero's engine, in which the oil contaminants in the oil collect on the inner surface of the rotating drum together with water, which is removed from the rotating drum through the extraction mechanism located on the drum shaft.

In still more particular aspects this invention relates to the water extraction mechanism, of a centrifugal filter based on the principle of Hero's engine, which extraction mechanism is capable of separating the centrifuged water-oil mixture, retaining the water outside of the rotating drum and returning the separated oil back to the system reservoir.

Centrifugal oil filters, using a rotating drum, powered by the reaction of oil jets, are well known in the art. In such filters incoming oil is subjected to very high centrifugal forces, resulting in separation of solid contaminants and water. During operation of the filter the water can be removed from the space adjacent to the inner surface of the drum, by the water conducting tubes, communicating with the hollow shaft. If a certain maximum quantity of the centrifuged water is allowed to collect in the rotating drum, the centrifugal filter loses its effectiveness in a continuous fashion bypassing the additional centrifuged water. If the water is extracted from a thin layer, collected at the inner surface of the rotating drum, the water conducting tubes during the water ejection process pass a water-oil mixture, resulting in a comparatively large loss of oil. Since it is very difficult to determine the quantity of water, at a time, centrifuged within the rotating drum, it is very difficult, if not impossible to efficiently drain the water without losing significant quantities of oil in the process. While operating the centrifugal oil filter for a prolonged period the loss of oil through the water extraction circuit may eventually drain the system reservoir, make the system inoperative and may result in damage to the system components, like for example the system pump.

In still more particular aspects this invention relates to a water extraction mechanism of a centrifugal filter based on the principle of Hero's engine, which extraction mechanism is capable of separating the centrifuged water-oil mixture, returning the separated oil back to the system reservoir and automatically rejecting the separated water to outside of the system.

SUMMARY OF THE INVENTION

It is therefore the principal object of this invention to provide a centrifuged water extraction device, which will separate the extracted water-oil mixture into water and oil, return the oil, on a continuous basis, back into the centrifugal filter system and reject the separated water to outside of the centrifugal filter system.

Another object of this invention is to provide a centrifuged water extraction device, which includes a gravity type separator, separating the extracted water-oil mixture into oil and water, returning the separated oil on a continuous basis back into the centrifugal filter system and through an automatic water ejection control limit the quantity of water contained in the gravity type separator.

It is another object of this invention to provide an automatic water ejection control, responsive to viscosity of the liquid contained in the gravity type separator, and operable to limit the quantity of the water collected in the gravity type separator to a specific predetermined volume.

It is another object of this invention to provide an automatic water rejection control, responsive to the difference between the density of oil and water contained in the gravity type separator, and operable to limit the quantity of water collected in the gravity type separator to a specific predetermined volume.

Briefly the foregoing and other additional advantages of this invention are accomplished by providing a novel centrifuged water extraction device from the rotating drum of a centrifugal filter, based on the principle of Hero's engine, which in a continuous fashion regulates the rate of flow of water-oil mixture from the inner surface of the drum, separates the mixture into oil and water, returns the oil on a continuous basis back to the centrifugal filter system and through an automatic water rejection control limits the quantity of water contained in the centrifuged water extraction device to a specific predetermined volume.

Additional objects of this invention will become apparent when referring to the preferred embodiments of the invention as shown in the accompanying drawings and described in the following description.

DESCRIPTION OF THE PREFERRED EMBODIMENTS

Figure 1:
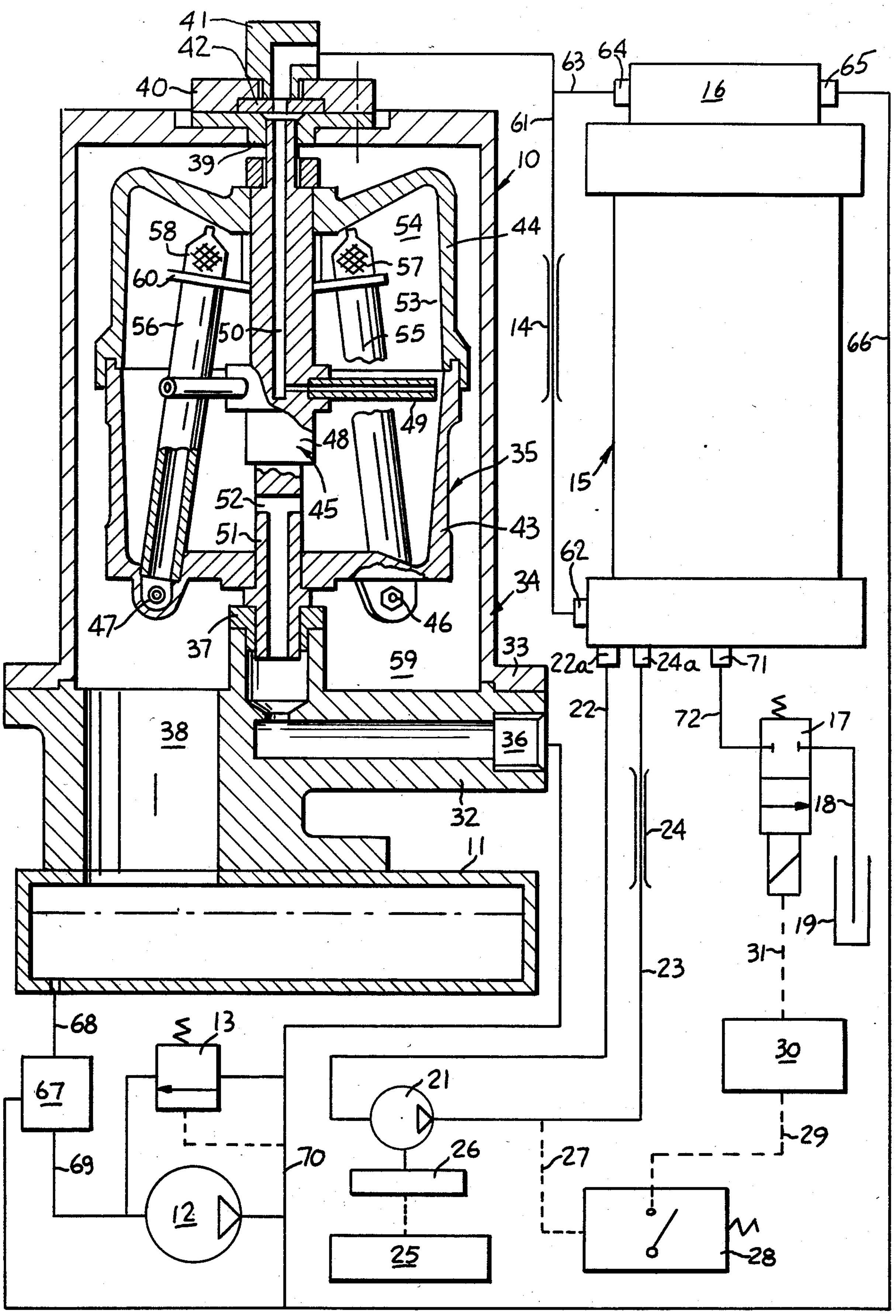
FIG. 1 is a sectional view through the centrifugal filter and reservoir with diagrammatically shown gravity type separator with system pump, water level control, pressure switch, time delay relay, solenoid operated water ejection valve and connecting lines shown schematically.

Referring now to FIG. 1, a centrifugal filter separator assembly, generally designated as 10, is shown mounted on system reservoir 11 and supplied with pressure oil, from schematically shown pump 12, provided with a conventional relief valve 13. The centrifugal filter separator assembly 10 is integrated into a water-oil separation and recovery circuit, consisting of viscous resistance 14, gravity separator, generally designated as 15, which includes a pressurizing and oil bypass valve 16 and a water ejection circuit, consisting of an on-off solenoid valve 17, connected by line 18 to a water vessel 19 and operated by a water level sensing control. The water level control includes a circulating pump 21, supplied with fluid from port *22a* of the gravity separator 15 by line 22. The circulating pump 21 discharges the fluid back to the gravity type separator 15 through discharge line 23, viscous resistance 24 and port *24a*. The circulating pump 21 is driven by an electric motor 25 through a drive mechanism 26. The discharge line 23, of the circulating pump 21, is connected by a sensing line 27 to a pressure switch 28, which, in a well known manner, in response to pressure level, generates an electrical signal through line 29 to time delay relay 30, connected through electrical signal transmitting line 31 to the on-off solenoid valve 17. The centrifugal filter separator 10 comprises a base 32 and a cover 33, forming together a housing, generally designated as 34, which mounts on the vertical axis a drum assembly generally designated as 35. The base 32 is provided with inlet 36, conducting oil under pressure to a lower internal bearing 37 and an oil outlet 38. The cover 33 is provided with an upper internal bearing 39, secured in place by plate 40, mounting centrifuged water extraction fitting 41. A reaction washer 42, provided with an oil passage, is retained between the upper internal bearing 39 and the plate 40. The drum assembly, generally designated as 35, includes a lower cup 43 and an upper cup 44, secured together, in sealing engagement, by a shaft assembly, generally designated as 45. The lower cup 43 is provided with two reaction jet nozzles 46 and 47. The shaft assembly 45 is provided with a water extract ion device 48, provided with water extraction tubes 49, communicating with an internal passage 50, provided in a shaft 51. The shaft 51 is provided with oil inlet passage 52, communicating the inlet 36 with internal space 54 of the drum assembly 35 and internal passage 50, communicating the water extraction tubes 49 of the water extraction device 48, with the centrifuged water extraction fitting 41. The water extraction tubes 49 are extending towards and located in proximity of the internal surface 53, of the drum assembly 35. The pressure oil, from internal space 54 of the drum assembly 35, is conducted through the inlet tubes 55 and 56, provided with strainers 57 and 58, to the reaction jet nozzles 46 and 47, which communicate directly with internal space 59, connected by oil outlet 38 with the reservoir 11. A flat spring 60 maintains inlet tubes 55 and 56 in contact with the lower cup 43 and in communication with the reaction jet nozzles 46 and 47. The centrifuged water extraction fitting 41 is connected by line 61 and viscous resistance 14 to port 62 of the gravity type separator 15, while also being connected by line 63 to port 64 of pressurizing and oil bypass valve 16. The pressurizing and oil bypass valve 16 is connected by port 65 and line 66 to the oil injection fitting 67, connected by line 68 to the reservoir 11 and by line 69 to the pump 12. The output of the pump 12 is connected by line 70 to inlet 36 of the centrifugal filter separator assembly 10. The gravity type separator 15 is connected through the water discharge port 71 and line 72 to the on-off solenoid valve 17, responsive to a signal from the water level control and operable to conduct water through line 18 to the water vessel 19.

Figure 2:
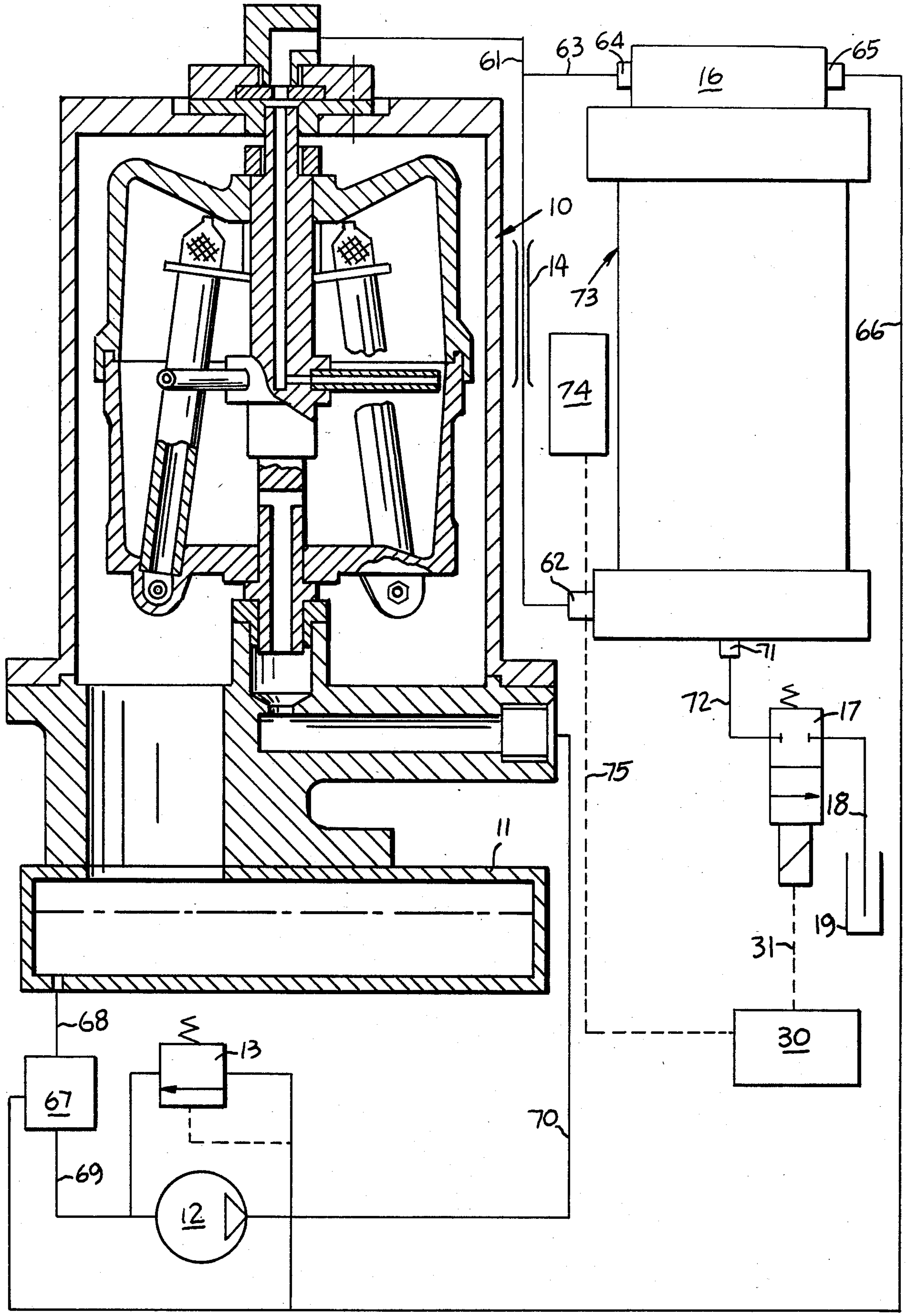
FIG. 2 is a sectional view through the centrifugal filter and reservoir with diagrammatically shown gravity type separator with system pumps, water level control of a float type, time delay relay, solenoid operated water ejection valve and connecting lines shown schematically.

Referring now to FIG. 2, the separator system controls are generally similar to those of FIG. 1, like components being designated by like numerals. The centrifugal filter assembly 10 mounted on system reservoir 11 of FIG. 2 is identical to that of FIG. 1 and so is the pump 12 and relief valve 13. The gravity type separator, generally designated as 73, provided with the pressuring and oil bypass valve 16 of FIG. 2, is phased into an identical circulating system with other system components, in a manner identical to that as shown in FIG. 1. The only basic difference between the systems shown in FIG. 1 and FIG. 2 is the type of water level sensing control, generating an electrical control signal to the on-off solenoid valve 17. The water level sensing control of FIG. 2 is provided with a reed switch 74, responding to a magnetic field, generated within the gravity type separator 73 and generating an electrical control signal transmitted through line 75 to the time delay relay 30, which transmits an electrical control signal through line 31 to the on-off solenoid valve 17.

Figure 3:
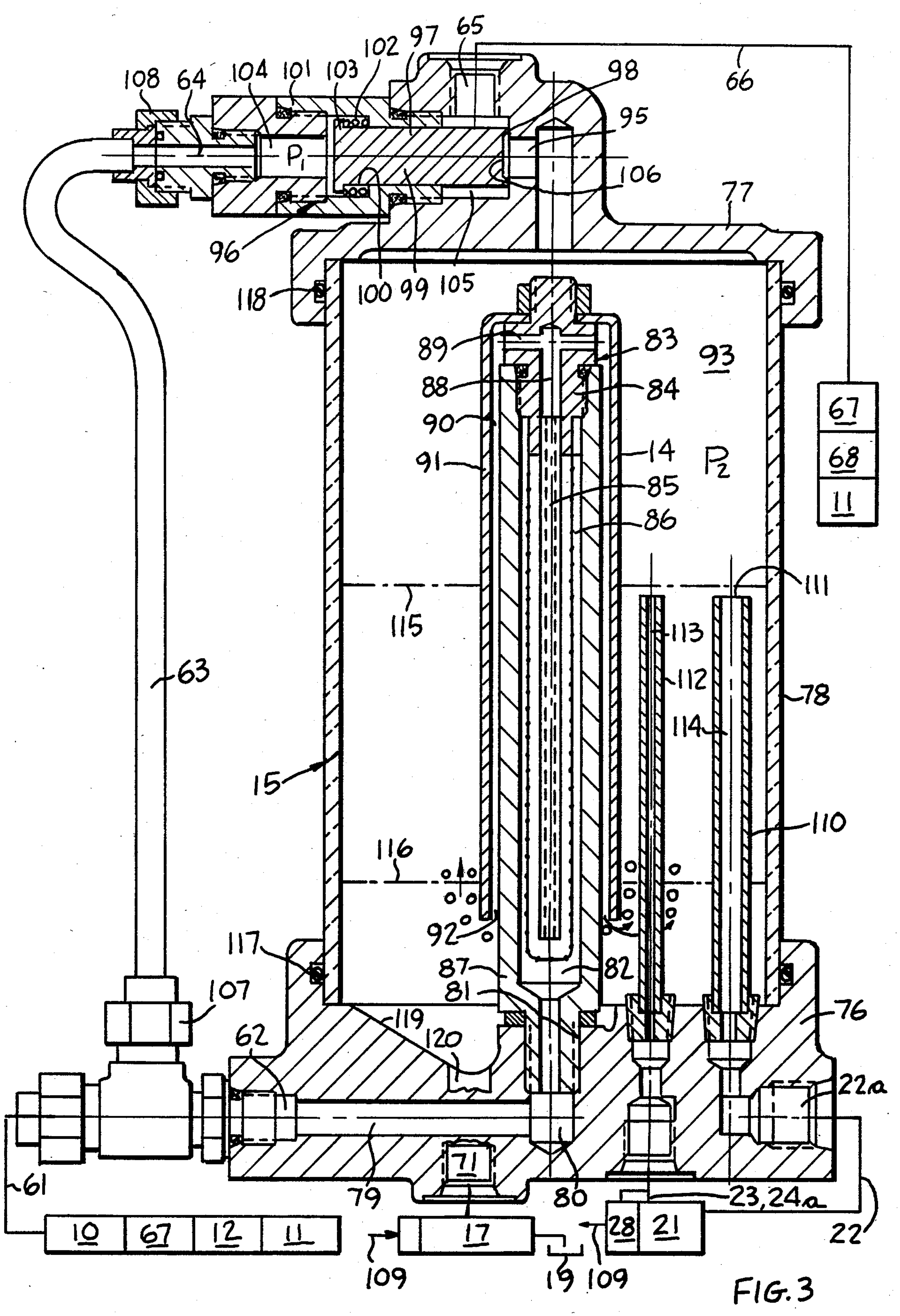
FIG. 3 is a section view through a gravity type separator provided with a viscous flow control device, a differential pressurizing valve and circulating circuit of viscosity sensing control with other system components shown schematically.

Referring now to FIG. 3, the gravity type separator, generally designated as 15 and diagrammatically shown in FIG. 1, comprises a lower cup 76, provided with port 62 and water discharge port 71, an upper cup 77 provided with port 65 and spacer tube 78, all secured together by external bolts, not shown. Port 62 communicates by passage 79 with inlet space 80, communicating through passage 81 with the assembly of viscous resistance 14, schematically shown in FIG. 1. The oil and water mixture from passage 81 is conducted to cylindrical space 82, housing capillary tube assembly, generally designated as 83. The capillary tube assembly 83 is provided with a fitting 84 with a capillary tube 85 and contaminant screen 86, which projects into space 82, defined by the stem 87. The capillary tube 85, secured to fitting 84, communicates directly with passages 88 and 89, which in turn communicate with the internal space 90, defined by flow shield 91. Internal space 90 communicates through outlet 92 with the internal space 93, defined by spacer tube 78. The upper cup 77, of the gravity type separator 15, is provided with a differential pressure relief valve assembly, generally designated as 96. The differential pressure relief valve 96 comprises a differential piston 97, provided with a throttling edge 98 and a cylindrical portion 99, guided in sealing engagement by surface 100 in differential sleeve 101. A differential spring 102 is interposed between the differential sleeve 101 and the head portion 103 of the differential piston 97. The head portion 103, of the differential piston 97, projects into space 104, directly communicating with port 64, which is subjected to P1 pressure. The throttling edge 98, of differential piston 97, projects into space 105, directly communicating with port 65 and selectively engages sealing surface 106, containing passage 95. Line 63, provided with fittings 107 and 108, connects ports 62 and 64. Port 62 is connected by line 61, see FIG. 1, to the water ejection circuit of the centrifugal filter separator assembly 10, supplied from pump 12, connected to reservoir 11. Water discharge port 71 is connected through on-off solenoid valve 17 to the water vessel 19, in response to an electrical control signal 109, generated by the pressure switch 28 of FIG. 1. The circulating pump 21 is supplied with fluid through line 22 from port 22*a*, connected to inlet tube 110, provided with an inlet surface 111. The discharge port of the circulating pump 21 is connected through line 23 and port 24*a* to capillary tubing 112, which is schematically shown in FIG. 1 as viscous resistance 24. The capillary tubing 112 is provided with a capillary passage 113, while the inlettube 110 is provided with an inlet passage 114. The dotted lines 115 and 116 show the position of the water-oil miniscus within the spacer tube 78 and are included for purposes of demonstration of the principle of the water level sensing control. The port 65 is connected by line 66 to the oil injection fitting 67, connected by line 68 to the reservoir 11. The spacer tube 78, which may be of a transparent material, is sealed in respect to the lower cup 76 and the upper cup 77 by seals 117 and 118. Internal space 93, subjected to P2 pressure, at the lower end is defined by surface 119, communicating by passage 120 with water discharge port 71.

Figure 4:
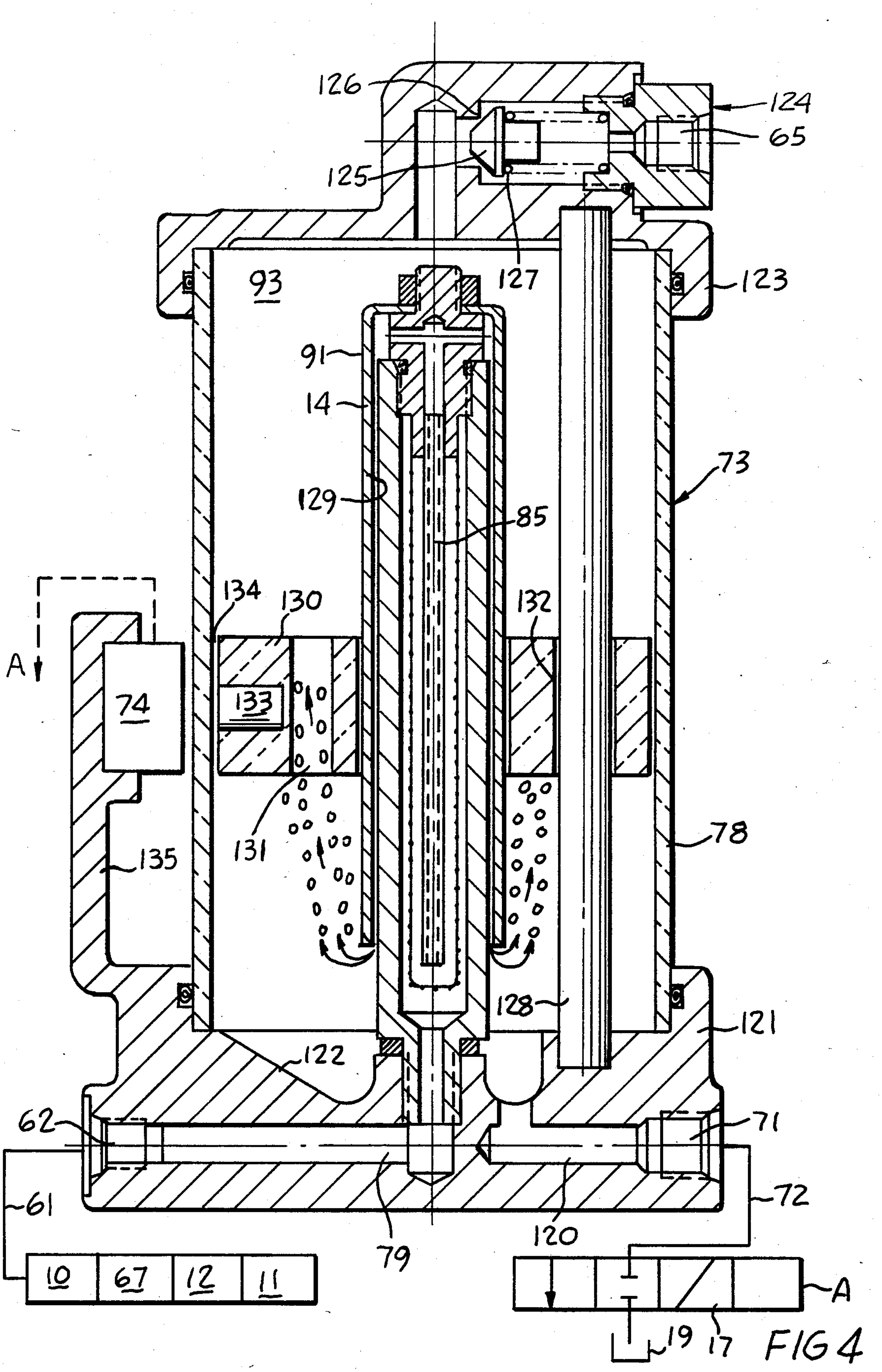
FIG. 4 is a sectional view through a gravity type separator provided with a float positioned by densities of liquids in the vicinity of the interface of water and oil, a magnet and reed switch combination and a pressurizing valve, with the other system components shown schematically.

Referring now to FIG. 4, the gravity type separator 73, also shown in FIG. 2, is similar to the gravity type separator 15 of FIG. 3, also shown in FIG. 1, like components being designated by like numerals. The components of viscous resistance 14 of FIG. 4 are identical to those of FIG. 3 and so is the spacer tube 78, which can be made out of transparent material, or a non-magnetic type metallic material, like aluminum or certain types of stainless steel. The internal space 93, of the gravity type separator 73, is connected through viscous resistance 14, passage 79 and port 62, both in the lower cup 121, with the water ejection circuit of centrifugal filter separator 10, in a manner similar to that as shown in FIG. 3. The internal space 93 at the lower end is defined by surface 122, communicating by passage 120 with water discharge port 71, which in turn is connected by line 72 with the on-off solenoid valve 17, responding to a control signal A and selectively connecting internal space 93 with the water vessel 19. The upper cup 123, in sealing engagement with the spacer tube 78, is provided with a relief valve assembly, generally designated as 124, which is interposed between internal space 93 and port 65. The relief valve assembly 124, of a type well known in the art, is composed of a poppet 125, biased toward sealing engagement with sealing edge 126 by the spring 127. A cylindrical guide rod 128 is located in internal space 93 between the lower cup 121 and the upper cup 123. The flow shield 91 with its external cylindrical surface 129 cooperates in sliding engagement and radially locates a float 130. The float 130 is provided with flow passages 131, a guiding surface 132, in sliding engagement with the cylindrical guide rod 128 and a permanent magnet 133, positioned in the vicinity of the inner surface of the spacer tube 78. The float 130 is radially spaced from the spacer tube 78 by cylindrical space 134 and angularly located by the cylindrical guide rod 128 in such a way that the permanent magnet 133 works in the plane of the reed switch 74, which is operable to transmit the control signal A to the on-off solenoid valve 17. The reed switch 74 is located adjacent to the spacer tube 78 by extension 135 of the lower cup 121.

Referring now back to FIG. 1, oil under pressure is supplied from the pump 12 to the inlet 36 of the centrifugal filter separator 10 and reacting on the cross-sectional area of the shaft assembly 45, journalled in the lower internal bearing 37, lifts the drum assembly 35 upwards to a point, at which the upper end of the shaft 51 guided in the upper internal bearing 39, will contact in sealing engagement the surface of the reaction washer 42, lining up the passage provided in the reaction washer with the internal passage 50. Since the cross-sectional area of the lower portion of the shaft 51, guided in the lower internal bearing 37 is substantially larger than the upper portion of the shaft 51, guided in the upper internal bearing 39, the drum assembly 35 will remain in this lifted position, as long as pressure oil is supplied to the inlet 36. Oil under pressure is transmitted from the inlet 36, through the oil inlet passage 52 in the shaft 51, to the internal space 54 of the drum assembly 35, from where the oil under pressure is transmitted through strainer 57 and 58 and inlet tubes 55 and 56 to the reaction jet nozzles 46 and 47. In a well known manner, a jet of oil will be ejected through both reaction jet nozzles in opposite directions, providing a reaction torque, which will rotate the drum 35 in bearings 37 and 39, around its vertical axis. Under those conditions the speed of rotation of the drum 35 may exceed, say 5000 revs. per minute, subjecting the oil, contained in space 54 of the drum 35, to centrifugal accelerations in excess of 2000 Gs. In a well known manner, the solid dirt particles in the oil, together with heavy liquids like water will be centrifuged to the internal surface 53 of the drum 35, while clean oil, conducted through the inlet tubes 55 and 56, will be ejected by the reaction jet nozzles 46 and 47 to the space 59, enclosed by the housing 34, which is connected by the oil outlet 38 with the system reservoir 11. Therefore, contaminated oil from the reservoir 11 is recirculated on a continuous basis by the pump 12 through the centrifugal filter separator 10 and recirculated back to the reservoir 11, while some of the solid contaminants and water will be retained within the rotating drum 35.

The solid contaminants and the water are centrifuged from the oil, and maintained by the centrifugal forces against the internal surface 53 of the drum 35. The solid contaminants form a layer of thick paste on the surface 53, which may attain a considerable thickness, while the centrifuged water forms another layer, maintained by centrifugal force on top of the layer of solid contaminants. Periodically the drum assembly 35 is disassembled and the layer of solid contaminants removed from the surface 53.

The centrifuged water can be extracted from the rotating drum 35 during operation of the centrifugal filter separator 10. With the passage through the centrifugal water extraction fitting 41 open and the shaft 51 maintained in sealing engagement with the reaction washer 42, the centrifuged water, collected in the form of a layer on the surface 53, will be passed through the water extraction tubes 49 to the internal passage 50 and therefore out of the rotating drum 35. The outer ends of the water extraction tubes 49 are maintained in close proximity in respect to the inner surface 53, so that the maximum amount of water can be extracted.

The centrifuged water, passed through the water extraction tubes 49 will collect a small amount of solid contaminants from the internal surface 53, maintaining the internal surface 53, in the vicinity of the ends of the water extraction tubes 49, relatively clear of solid contaminants and with free access to the layer of centrifuged water.

With the water passage in the centrifuged water extraction fitting 41 closed, after a certain maximum quantity of centrifuged water is allowed to collect in the rotating drum 35, the centrifugal filter loses its effectiveness, in a continuous manner by passing additional centrifuged water back to reservoir 11. If on the other hand the water is extracted from a thin layer collected at the inner surface 53 of the rotating drum 35, the water extracting tubes 49, during the water ejection process, pass a water-oil mixture, resulting in a comparatively large loss of oil. Since it is very difficult to determine the quantity of water, at a time, centrifuged within the rotating drum 35, it is very difficult, if not impossible, to efficiently drain the water without losing a significant quantity of oil in the process Such a loss of oil is not only expensive, but with the centrifugal filter operating for a prolonged period, the loss of oil may make the system inoperative.

In the arrangement of FIG. 1 a small controlled quantity of oil-water mixture is drained on a continuous basis from the inner surface 53 of the rotating drum 35 and passed through line 61 and viscous resistance 14 to port 62 of the gravity type separator 15. As will be shown and described in detail, when referring to FIGS. 3 and 4, with the viscous resistance 14, located inside the gravity type separator 15, the water-oil mixture is separated inside the gravity type separator and the separated oil returned on a continuous basis from port 65 and line 66 to the oil injection fitting 67. The quantity of oil-water mixture extracted from the centrifugal filter separator 10 and passed through the gravity type separator 15 is comparatively small in the order of a few hundred cubic centimeters per minute, while the flow of contaminated oil through the pump 12 is comparatively large, in the order of a number of gallons per minute. The oil injection fitting 67, which might be provided with an injection venturi type device, well known in the art, will introduce into the oil, supplied from the reservoir 11, the full quantity of liquid, discharged from the separator 15, which will carry a quantity of solid contaminants and may carry, as will be described later in the text, when referring to FIGS. 3 and 4, a quantity of small water droplets, or oil-water emulsion, not precipitated in the gravity type separator 15. Therefore, in this way, with excess oil all of the solid contaminants and unprecipitated water droplets are supplied to the gravity type separator and are introduced on a continuous basis directly back into the centrifugal filter separator 10, where those contaminants in the form of solid particles and water, are redeposited on the surface 53 of the rotating drum 35, without contaminating the oil in the reservoir 11 and making sure than none of the oil from the reservoir 11 is lost, during the water extraction process.

The quantity of water is continuously increasing in the gravity filter separator 15 and retained outside of the centrifugal filter system. With the increase in the quantity of water retained within the gravity filter separator 15, the miniscus separating the oil and water is rising. To control the highest position of the miniscus within the gravity type separator 15 an automatic control is introduced and schematically shown in FIG. 1, which drains the water from the gravity type separator 15 on an intermittent basis to prevent the miniscus reaching a level higher than a certain predetermined value. The automatic control of the maximum water level within the gravity type separator 15, schematically shown in FIG. 1, and shown in detail in FIG. 3, is of a type which distinguishes between the viscosity of oil and water in determination of the position of the miniscus. The automatic miniscus position control of FIG. 1 comprises a circulating pump 21 with a very small flow capacity, which is supplied from the gravity type separator 15 with fluid through the line 22. The discharge flow from the circulating pump 21 is passed back to the gravity type separator 15 through the line 23 and the viscous resistance 24, which determines the pressure in line 23. The line 23 is connected by sensing line 27 with the pressure switch 28 which transmits an electrical signal through line 29 to time delay relay 30, once the pressure in the sensing line 27 drops below a certain predetermined value. The electrical signal from the time delay relay 30, through the on-off solenoid valve 17, connects the inside of the gravity type separator 15 with the water vessel 19, draining the water from the gravity type separator 15, during the time period as determined by the setting of the time delay relay 30. The rate of discharge of water from the gravity type separator 15, and therefore lowering of the position of the water-oil miniscus within the gravity type separator 15, depends on a number of factors, which will be described in detail when referring to FIG. 3.

Referring now back to FIG. 2, the circulating system and controls, of the centrifugal filter separator 10, similar to that of FIG. 1, is shown, like components being designated by like numerals. The assemblies of centrifugal filter separators 10 of FIGS. 1 and 2, together with the pump 12, are identical. The water extraction circuits of the centrifugal filter separators of FIGS. 1 and 2 are connected, in an identical manner, to the gravity type separators 15 and 73, which in turn are similar and perform an identical function in separating oil from water. The only difference between the gravity type separators 15 and 73 of FIGS. 1 and 2 lies in the type of automatic control, used in limiting the position of the water oil miniscus. The automatic control of the gravity type separator 15 is based on the principle of the difference between the viscosity of water and oil was briefly described when referring to FIG. 1 and is shown in detail in FIG. 3. The automatic control of the gravity type separator 73 of FIG. 2 is based on the principle of the difference in the density between oil and water, utilizes a float type mechanism, shown in FIG. 4, and is provided with a float position sensing reed switch 74. The electrical signal from the reed switch 74 initiates a water rejection cycle through the use of the time delay relay 30 and the on-off solenoid valve 17, identical to those shown and described, when referring to FIG. 1.

Referring now to FIG. 3, a mixture of oil and water is supplied to port 62 of the gravity type separator 15, schematically shown in FIG. 1. This continuous flow of water-oil mixture is extracted from the vicinity of the internal surface 53 of the drum assembly 35, through the water extraction device 48, see FIG. 1. As described when referring to FIG. 1, the centrifuged water, maintained by centrifugal force against the internal surface 53, is drained off by the water extraction device 48 with comparatively large quantities of oil being drawn from the drum assembly 35. The extracted water is in the form of well defined droplets, varying in size from comparatively large to very small, depending on the thickness of the layer of water, centrifuged at the innner surface 53. Those water droplets, suspended in oil, flow from port 62 through passages 79 and 81, space 82, contaminant screen 86, capillary tube 85, passages 88 and 89 and annular internal space 90 to outlet 92 and internal space 93 of the gravity type separator 15.

The differential pressure relief valve assembly 96 of FIG. 3 permits selection of very small pressure differentials, acting across the capillary tube 85, maintaining this differential constant, irrespective of the changes in working conditions in the centrifugal filter assembly 10 and the setting of the relief valve 13 of FIG. 1. Differential piston 97 of the differential pressure relief valve assembly 96 is subjected on one end to the pressure P1 in port 62, which is conducted by line 63 to the space 104 and on the other side to the pressure P2 in the space 93 of the gravity type separator 15. The pressure P2 in space 93 is equal to the pressure in port 62, less the pressure drop developed, due to flow through the viscous resistance of the capillary tube 85, the losses, due to flow through other passages of viscous resistance 14, being negligible. The differential piston 97 is provided with a throttling edge 98, working in cooperation with the sealing surface 106. The area enclosed by the throttling edge 98 very closely approaches the cross-sectional area of the differential piston 97. Differential piston 97 is biased in the direction, away from the sealing surface 106 by differential spring 102. Therefore, through its throttling action, the differential pressure relief valve assembly 96 will always maintain a constant pressure differential ΔP across the capillary tube 85, irrespective of the variation in the magnitude in P1 pressure, ensuring that the flow through the capillary tube 85 is always inversely proportional to the viscosity of the liquid flowing through it. In this way, the flow through the gravity type separator 15 will be adjusted by the ratio of oil to water mixture and by the temperature of oil, maintaining the optimum separation efficiency and optimum quantity of separated water. Since the pressure differential, acting across the capillary resistance, through the use of the differential pressure relief valve assembly 96, is made completely independent of P1 pressure and is only dictated by the preload in the differential spring 102, the value of the pressure differential can be selected low, permitting the use of contamination tolerant, comparatively large internal diameter capillary tubing. As mentioned above the pressure differential, maintained at a relatively constant level, during operation of the gravity type separator 15, results in a specific flow through the viscous resistance of the capillary 85. The resulting flow of oil-water mixture is slowly ejected through the outlet 92, located near the bottom part of the gravity type separator 15. The water droplets, under the force of gravity, migrate downwards to the surface 119, eventually forming a distinct miniscus 116, as shown by the dotted line. The water droplets in the water-oil mixture join the volume of water, positioned below the miniscus 116, while the globules of oil rise through the water, pass through the miniscus 116 and join the volume of oil, which forms above the miniscus 116. With the increasing quantity of water retained in the gravity separator 15 the water-oil miniscus 116 will continue to rise, with oil filling the space above the miniscus. The oil above the miniscus is drawn through the inlet passage 14 in the inlet tube 110 and through port 22*a* and line 22 and is supplied to the inlet of the circulating pump 21, see FIG. 1. This oil from the circulating pump 21 is discharged through the line 23 to the gravity type separator 115, through schematically shown viscous resistance 24 of FIG. 1, which is equivalent to capillary tubing 112 of FIG. 3, provided with capillary passage 113. Therefore the circulating pump 21, on a continuous basis, and at a constant rate, circulates the fluid extracted at a specific level, equivalent to the length of the inlet tube 110, within the gravity type separator 15 and returns it back to the gravity type separator 15 through the capillary tubing 112. As is known to those skilled in the art, the resistance to flow through the capillary tubing is proportional to the viscosity of the fluid. Therefore change in viscosity of the fluid, passing through the capillary tube 112, will automatically result in a corresponding change in the discharge pressure of the circulating pump 21. The viscosity of water is relatively independent of the water temperature, while the viscosity of oil varies widely with the oil temperature. Nevertheless, the difference in viscosity between those two liquids will be no less than 20 to 1 and at lower temperatures may exceed 100 to 1. Therefore, with the circulating pump 21 circulating water, the resistance through the capillary tube 112 will be low, corresponding to the low discharge pressure of the circulating pump 21. If the circulating liquid becomes oil, the discharge pressure of the circulating pump 21, due to high resistance of the capillary tube 112, will increase by at least a factor of 20.

With the water-oil miniscus 116, located as shown in FIG. 3, the circulating pump 21, through the inlet tube 110, will circulate pure oil and maintain a high discharge pressure This relatively high discharge pressure will maintain the pressure switch 28 in an inactive position, with on-off solenoid valve 17 remaining closed, see FIG. 1. Once the water-oil miniscus will reach the dotted line 115, the inlet surface 111 of the inlet tube 110, will be positioned below the miniscus and therefore exposed to water. The circulating pump 21 will start passing water through the capillary tube 112 and the discharge pressure, developed by the circulating pump, due to reduction in flow resistance of the capillary tube 112, will drop to a very low level. The drop in discharge pressure of the circulating pump 21, in a well known manner, will activate the pressure switch 28, which in turn, through the time delay relay 30, will open the on-off solenoid valve 17, connecting the space within the gravity type separator 15 containing water with the water vessel 19. The water from the gravity type separator 15 will be evacuated during a specific time period, as dictated by the setting of the time delay relay. During this water ejection cycle the water-oil miniscus, within the gravity type separator, will be lowered below the inlet surface 111 and the circulating pump 21 will start circulating oil, increasing its discharge pressure and deactivating the pressure switch 28. Nevertheless, with pressure switch 28 deactivated, the water ejection cycle will continue as dictated by the setting of the time delay relay 30. Therefore, the setting of the time delay relay 30 and therefore the duration of the water ejection cycle will determine the distance, through which the water-oil miniscus is allowed to drop, below the position as shown by dotted line 115. This distance through which the water oil miniscus will be lowered, not only depends on the duration of the water ejection cycle, but also on the rate, at which the water is being ejected.

Once the miniscus 115 will approach a specific height, as previously described the automatic control is activated, connecting, through the solenoid valve 17 filled with water, the water vessel 19. Under those conditions the pressure inside the gravity type separator 15 will drop to near atomospheric pressure, the relief valve assembly 96 will close and under full pressure differential, equal to pressure developed in pump 12, the flow through capillary tube 85, at the maximum rate, will displace the water from the gravity type separator. Under those conditions mostly oil, with very little water, will fill the gravity type separator, while the water-oil miniscus will drop below the dotted line 115. Therefore, the rate of flow of oil, through the capillary tube 85, under the conditions of pressure differential, equal to the discharge pressure of pump 12 and therefore equal to P1 pressure, will determine the maximum rate, at which the water from the gravity type separator 15 can be evacuated, during the water ejection cycle. This rate of flow, during the time period as established by setting of the time delay relay, will determine the volume of water ejected during the water ejection cycle and therefore determine the distance, through which the oil-water miniscus is allowed to drop. The quantity of water per unit time being retained within the gravity type separator will determine the time, during which the water-oil miniscus will reach the position of the dotted line 115, thus establishing the time interval between the water ejection cycles, under any specific working condition of the system. Therefore the automatic control of FIG. 3 will, on a continuous basis, regulate and limit the maximum quantity of water, retained at a time in the gravity type separator. While the maximum quantity of water, retained in the gravity type separator, is limited to any specific predetermined value, the water separating function of the gravity type separator 15 is not interrupted and no oil is lost from the system, since all of the separated oil is automatically returned to the oil injection fitting 67, as described when referring to FIG. 1.

Referring now to FIG. 4, the gravity type separator 73 with its automatic water level controls, schematically shown in FIG. 2, while integrated into a system with other system components, is shown in detail in FIG. 4. The gravity type separator of FIG. 4 in many ways is similar to the gravity type separator of FIG. 3, like components being designated by like numerals. The gravity type separators of FIGS. 3 and 4 essentially perform the same function in separating the incomming fluid into water and oil and automatically limiting the volume of water inside the separator to a certain maximum value. There are two basic differences between the separators of FIGS. 3 and 4. The gravity type separator of FIG. 3 uses a differential pressure type relief valve to maintain a constant pressure differential across the capillary resistance 14, identical to that of FIG. 4, which is independent of the discharge pressure of pump 12.

The gravity type separator 73 of FIG. 4 uses a simple relief valve assembly 124, which may vary to a small degree, the pressure differential across the viscous resistance 14 with the variation in the discharge pressure of the pump 12.

The gravity type separator 15 of FIG. 3 is using an automatic control limiting maximum volume of water contained within the separator, based on the principle of difference of viscosity between water and oil.

The gravity type separator 73 of FIG. 4 is using an automatic control, limiting the maximum volume of water contained within the separator, based on the principle of the difference in density of water and oil.

The gravity type separator 73 of FIG. 4 is provided with an internal space 93, defined by the inner surface of the spacer tube 78, the bottom surface defined by the lower cup 121 and the upper surface defined by the upper cup 123. Assembly of the viscous resistance 14 is concentrically mounted in the lower cup 121, while the lower cup 121 and the upper cup 123 are maintained in angular alignment by a cylindrical guide rod 128. The float 130 working within internal space 93, is radially located in respect to the inner surface of the spacer tube 78, by sliding engagement with the outer surface 129 of the flow shield 91, while being angularly located in respect to the lower cup 121 by sliding engagement on the guiding surface 132, in respect to the cylindrical guide rod 128. The float 130 is provided with a number of flow passages 131 and is located radially to form cylindrical space 134, while being free to travel in upward and downward directions. The float 130 is provided with the permanent magnet 133, which is operable to close the reed switch 74, in a certain position of vertical alignment of the permanent magnet 133, in respect to the reed switch 74, well known in the art. In such a position the reed switch 74 is operable to transmit electrical signal A to the time delay relay 30 and on-off solenoid valve 17, see FIG. 1. The float 130 can be made of cellular material, for example like a closed cell foam and having an average density, smaller than water and larger than oil. In many systems a comparatively stable water-oil emulsion is generated, which then forms an intermediate layer between water and oil, with a clearly defined miniscus between the emulsion and water, while the miniscus between emulsion and oil is not clearly defined. If desired, the average density of the float can be so selected that it will float on water and sink in the emulsion of water and oil. The float 130, while floating on the water and travelling up and down, within the gravity type separator 73, must be constrained from rotation and therefore angularly aligned, so that the permanent magnet 133 can actuate the reed switch 74, which is located on the extension 135 of the lower cup 121. The vertical location of the reed switch 74, in respect to the lower cup 121, is selected for optimum efficiency of preparation, while also permitting the function of the automatic water ejection control.

Assume that float 130, while floating in separated water is loacted at the lower end of the space tube 78, well below the actuating level of the reed switch 74. With the increasing volume of water, separated wiuthin the gravity type separator 73, the float 130 floats upwards to a position, in which the permanent magnet 133 will close the contacts of the reed switch 74, generate an electrical control signal A to the time delay relay 30 and the on-off solenoid valve 17, initiating the water ejection cycle. The water ejection cycle, of the gravity type separator 73, is identical to the water ejection cycle of the gravity type separator 15 of FIG. 3, which was described in detail, when referring to FIG. 3, the quantity of water, ejected during each cycle, being a function of the tome setting of the time delay relay and the maximum rate of ejection of water during the cycle. Since, as previously stated, the maximum rate of ejection of water during the water ejection cycle is determined by the resistance to flow of oil through the capillary tube 85, under maximum pressure differential acting across it and equal to the pressure developed by the pump 12. Therefore the maximum rate of ejection of the water is strictly limited by the characteristics of the assembly of viscous resistance 17, which permits ejection rates many times greater than the flow through the viscous resistance 14 during the separating cycle of the gravity type separator.

With the gravity type separator 73 provided with the float 130, mounting the permanent magnet 133, the spacer tube 78 must be made from a non-metallic material, to permit operation of the reed switch 74.

The automatic control of the gravity type separators 15 and 73 of FIGS. 3 and 4 limit the the maximum volume of water, which is permitted to collect within the separator and can be made to respond either to the volume of water, or the volume of water combined with the intermediate layer of the water-oil emulsion, which still forms a definite miniscus with water. Because of the method of introduction of the separated oil in the gravity type separator into the circuit at the inlet to the centrifugal filter separator assembly, sensing of the water and water emulsion miniscus is preferable, since it ensures that all of the emulsion is eventually introduced back into the centrifugal filter and passes through the centrifugal field, resulting in at least partial separation, while making impossible any rejection of the water-oil emulsion, during the water ejection cycle.

The flow limiting function of the capillary resistance, in combination with the reduction of the pressure differential, acting across the resistance by a differential pressure or conventional relief valve, is preferable, but similar effect could be obtained by converting the energy of the fluid, entering the gravity type separator, into heat by throttling.

Although the preferred embodiments of this invention have been shown and described in detail it is recognized that the invention is not limited to the precise form and structure shown and various modifications and rearrangements as will occur to those skilled in the art upon full comprehension of this invention may be resorted to without departing from the scope of the invention as defined in the claims.

What is claimed is:

1. A centrifugal filter separator system comprising a stationary housing having an inlet port supplied with pressurized oil by a pump having a suction port connected to a reservoir, a clean oil outlet port connected to said reservoir, a centrifuged water port, and a rotatable drum Journalled in said housing and functionally connected with said inlet port, said clean oil outlet port and said centrifuged water port, gravity type separating means interconnected to said centrifuged water port operable to separate by gravity oil-water mixture into oil and water, oil conducting means operable to conduct separated oil from said gravity type separator to said reservoir, water level sensing means operable to sense the level of water separated in said gravity type separating means, and separated water ejecting means having means responsive to said water level sensing means, said separated water ejecting means operable to regulate the quantity of water in said gravity type separating means.

2. A centrifugal filter separator system as set forth in claim 1 wherein said gravity type separating means includes flow resistance means interconnected to said centrifuged water port, pressurizing means of said gravity type separating means operable maintain relatively constant pressure differential across said flow resistance means and interconnecting means operable to interconnect said pressurizing means and said oil conducting means.

3. A centrifugal filter separator system as set forth in claim 1 wherein said water level sensing means includes fluid flow circulating means and viscous resistance in said fluid circulating means.

4. A centrifugal filter separator system as set forth in claim 1 wherein said separated water ejecting means includes solenoid operated valve means interposed between said gravity type separating means and water exhaust means.

5. A centrifugal filter separator system as set forth in claim 1 wherein said means responsive to said water level sensing means includes means generating an electrical signal and electrical signal transmitting means and said water rejecting means includes means responsive to said electrical signal.

6. A centrifugal filter separator system as set forth in claim 5 wherein said electrical signal transmitting means includes time delay relay means.

7. A centrifugal filter separator system as set forth in claim 1 wherein said water level sensing means includes fluid viscosity sensing means.

8. A centrifugal filter separator system as set forth in claim 1 wherein said water level sensing means includes means operable to distinguish between density of water and oil.

9. A centrifugal filter separator system as set forth in claim 1 wherein said water level sensing means includes float means operable to sink in said oil and float on said water, magnet means in said float means and electrical switching means responsive to magnetic force of said magnet means and operable to transmit an electrical signal to said separated water ejecting means.

10. A centrifugal filter separator system as set forth in claim 9 wherein said gravity type separating means has guiding means operable to maintain angular orientation between said float means and said electrical switching means.

11. A centrifugal filter separator system as set forth in claim 9 wherein said gravity type separating means has container means operable to contain said oil and said water, said float means operable within said container means and said electrical switching means positioned outside of said container means.

* * * * *